(12) United States Patent
Johnston et al.

(10) Patent No.: US 10,994,834 B2
(45) Date of Patent: May 4, 2021

(54) CASE MOUNTED TRANSMISSION AVC FORCE GENERATORS

(71) Applicant: Sikorsky Aircraft Corporation, Stratford, CT (US)

(72) Inventors: Stephen Johnston, Winter Garden, FL (US); Joseph Caterisano, Jupiter, FL (US); William A. Welsh, North Haven, CT (US); Scott A. Chasen, Orange, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 557 days.

(21) Appl. No.: 15/902,315

(22) Filed: Feb. 22, 2018

(65) Prior Publication Data

US 2019/0256199 A1    Aug. 22, 2019

(51) Int. Cl.
*B64C 27/00* (2006.01)
*F16H 57/028* (2012.01)

(52) U.S. Cl.
CPC ......... *B64C 27/001* (2013.01); *F16H 57/028* (2013.01); *B64C 2027/004* (2013.01)

(58) Field of Classification Search
CPC .............. B64C 27/001; B64C 2027/004; F16H 57/028
See application file for complete search history.

(56) References Cited

U.S. PATENT DOCUMENTS

| | | | | |
|---|---|---|---|---|
| 5,310,137 A | * | 5/1994 | Yoerkie, Jr. | ........... B64C 27/001 244/17.27 |
| 6,105,900 A | * | 8/2000 | Welsh | ................... B64C 27/001 244/1 N |
| 7,118,328 B2 | | 10/2006 | Welsh et al. | |
| 8,267,652 B2 | | 9/2012 | Jolly et al. | |
| 9,359,082 B2 | * | 6/2016 | Mercier | ................. B64D 27/02 |
| 9,365,294 B2 | * | 6/2016 | Griffin | ................... B64D 35/00 |
| 10,112,708 B2 | * | 10/2018 | Darrow, Jr. | ............. B64C 27/10 |
| 10,443,675 B2 | * | 10/2019 | Welsh | ..................... B64C 27/14 |
| 10,570,887 B2 | * | 2/2020 | Son | ......................... G01H 1/006 |
| 2006/0157310 A1 | | 7/2006 | Lee et al. | |
| 2012/0292434 A1 | * | 11/2012 | Welsh | ................... B64C 27/001 244/17.27 |

* cited by examiner

*Primary Examiner* — Philip J Bonzell
*Assistant Examiner* — Michael B. Kreiner
(74) *Attorney, Agent, or Firm* — Foley & Lardner LLP

(57) ABSTRACT

An active vibration control system for an aircraft includes a gearbox operably coupling a power source and a component rotatable about an axis. The gearbox includes a flexible region which allows flexure between a first stage and a second stage. At least one active vibration control actuator is arranged in vibrational communication with the flexible region to counteract vibrations transmitted between the power source and the rotatable component.

18 Claims, 4 Drawing Sheets

CASE MOUNTED TRANSMISSION AVC FORCE GENERATORS

BACKGROUND

The subject matter disclosed herein generally relates to producing large, controllable, vibratory forces to compensate for sensed noise or vibrations, and more particularly to an active vibration control (AVC) system for a gearbox.

Rotary wing aircraft, or rotorcraft, can generate significant vibratory responses during operation. The primary source of such vibration is that generated by the main rotor system rotating at some rotational speed while the aircraft is flying at some forward speed. The vibration occurs at this rotational speed times the number of blades, commonly called the blade passing frequency. The vibratory forces and moments are transmitted through the gearbox into the airframe, resulting in airframe vibration. One approach to counteracting such vibration involves replacing a rigid gearbox mounting strut with a compliant strut and parallel hydraulic actuator. A control computer commands the actuator such that the gearbox is selectively vibrated to produce inertial forces which minimize airframe vibrations. Although effective, this approach is inadequate in certain situations, such as a vehicle having a gearbox secured directly to the airframe, without mounting struts.

Another approach utilizes a first pair of counter-rotating eccentric masses that rotate at the frequency of the primary aircraft vibration and generate a fixed magnitude vibration force but variable phase. The fixed magnitude force is then paired with a constant magnitude, variable phase load from a second pair of counter-rotating masses to produce a resultant vibratory force of variable magnitude and phase. This method is heavy as it requires multiple eccentric masses powered by multiple motors and often these must be enclosed in separate housings to allow for geometric alignments that minimize unwanted moments and are thus not amenable to weight reductions. A typical approach to reduce weight in such a system would be to reduce the weight of the masses, and increasing the radius of their rotation to compensate for the reduced mass. However, since the system is circular in configuration, weight of housing components increases with radius squared, thus negating the desired weight reduction. Additionally aircraft sometimes experience multiple frequencies of ambient vibration caused by forward flight load on the rotor systems. The counter-rotating eccentric mass type actuator is only suitable for generating one frequency of anti-vibration load as the load frequency is determined by the rotational speed of the eccentric masses. This is undesirable as it requires multiple such anti-vibration actuators to suppress multiple frequencies of ambient vibration.

Accordingly, it is desirable to provide active vibration control system which generates relatively large controllable vibratory forces with a lower weight and smaller size than conventional systems.

BRIEF DESCRIPTION

According to one embodiment, an active vibration control system for an aircraft includes a gearbox operably coupling a power source and a component rotatable about an axis. The gearbox includes a flexible region which allows flexure between a first stage and a second stage. At least one active vibration control actuator is arranged in vibrational communication with the flexible region to counteract vibrations transmitted between the power source and the rotatable component.

In addition to one or more of the features described above, or as an alternative, in further embodiments the gearbox further comprises: a transmission case including the flexible region and being connectable to a power source; and a support element mounted to the transmission case and configured to support the component rotatable about the axis relative to the support element, the power source being coupled to the component via the gearbox to drive rotation of the component about the axis.

In addition to one or more of the features described above, or as an alternative, in further embodiments the transmission case includes at least the first stage and the second stage.

In addition to one or more of the features described above, or as an alternative, in further embodiments the power source is connectable to the first stage and the support element is connected to the second stage.

In addition to one or more of the features described above, or as an alternative, in further embodiments the at least one active vibration control actuator is coupled to the first stage of the transmission case.

In addition to one or more of the features described above, or as an alternative, in further embodiments comprising an attachment plate coupled to a surface of the transmission case, wherein the at least one active vibration control actuator is mounted to the flexible region of the transmission case via the attachment plate.

In addition to one or more of the features described above, or as an alternative, in further embodiments the at least one active vibration control actuator is operable to generate a load in a plane of an upper surface of the attachment plate.

In addition to one or more of the features described above, or as an alternative, in further embodiments the at least one active vibration control actuator is mounted laterally across a width of the attachment plate.

In addition to one or more of the features described above, or as an alternative, in further embodiments the at least one active vibration control actuator is mounted longitudinally across a depth of the attachment plate.

In addition to one or more of the features described above, or as an alternative, in further embodiments the at least one active vibration control actuator is operable to generate a vertical and longitudinal load in the attachment plate.

In addition to one or more of the features described above, or as an alternative, in further embodiments the at least one active vibration control actuator includes a controller coupled to a force generator, the at least one active vibration control actuator being oriented such that an axis of the force generator is parallel to the upper surface of the attachment plate.

In addition to one or more of the features described above, or as an alternative, in further embodiments comprising a force transmission element for transmitting forces generated by the at least one active vibration control actuator to counteract the vibrations transmitted between the power source and the rotating component to the attachment plate.

In addition to one or more of the features described above, or as an alternative, in further embodiments the at least one active vibration control actuator includes a first active vibration control actuator and a second active vibration control actuator.

In addition to one or more of the features described above, or as an alternative, in further embodiments the at least one active vibration control actuator is mounted to the attachment plate at an exterior of the gearbox.

In addition to one or more of the features described above, or as an alternative, in further embodiments the at least one active vibration control actuator is mounted to the attachment plate at an interior of the gearbox.

According to another embodiment, a rotary-wing aircraft includes an airframe and a drive system including a power source and a gearbox having a flexible region connected to the power source. A rotor assembly is operably coupled to the drive system. At least one vibration control actuator in arranged in vibrational communication with the flexible region of the gearbox to counteract vibrations transmitted between the power source and the rotor assembly.

In addition to one or more of the features described above, or as an alternative, in further embodiments the flexible region of the gearbox includes a first stage coupled to the power source and a second stage including a support element for receiving a rotating component of the rotor assembly.

In addition to one or more of the features described above, or as an alternative, in further embodiments the flexible region is formed between the first stage and the second stage.

In addition to one or more of the features described above, or as an alternative, in further embodiments the at least one vibration control actuator is coupled to the first stage of the gearbox.

In addition to one or more of the features described above, or as an alternative, in further embodiments comprising an attachment plate for indirectly connecting the at least one vibration control actuator to the gearbox.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Figure 1:
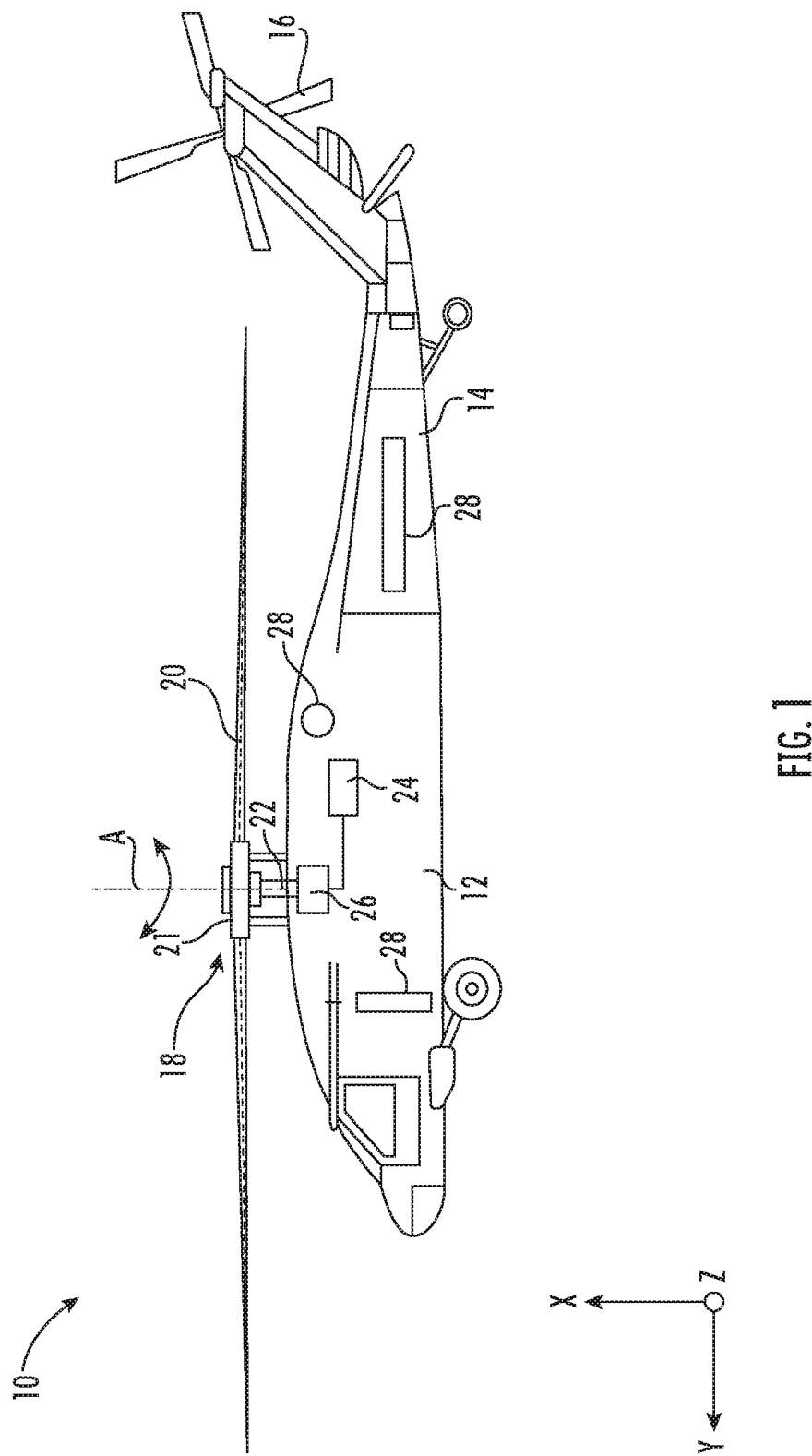
FIG. 1 is a schematic view of an example of a rotary wing aircraft.

FIG. 1 schematically illustrates an example of a vertical take-off and landing (VTOL) rotary wing aircraft 10. The aircraft 10 includes an airframe 12 having an extending tail 14 which mounts an anti-torque system 16, such as a tail rotor system. While shown as an anti-torque system 16, it is to be understood the anti-torque system 16 can be a translational thrust system, a pusher propeller, a rotor propulsion system, and the like in addition to or instead of the shown anti-torque system. The airframe 12 of the aircraft supports a main rotor system 18. The main rotor system 18 includes a plurality of rotor blade assemblies 20 mounted to a rotor hub 21. The main rotor system 18 is driven by a drive shaft 22 about an axis of rotation A through a main gearbox (illustrated schematically at 26) by a power source, such as one or more engines 24. The main gearbox 26 may be interposed between the one or more engines 24, the main rotor system 18, and the anti-torque system 16. The main gearbox 26 is mechanically connected to the main rotor system 18 and to the anti-torque system 16 so that the main rotor system 18 and the anti-torque system 16 may both be driven by the main rotor gearbox 26.

Although a particular helicopter configuration is illustrated and described in the disclosed embodiment, other configurations aircrafts and vehicles, such as high speed compound rotary wing aircrafts with supplemental translational thrust systems, dual contra-rotating, coaxial rotor system aircrafts, tilt-rotors and tilt-wing aircrafts, and fixed wing aircrafts, may also benefit from embodiments of the disclosure.

To suppress vibration of the airframe 12 resulting from, for example, rotation of the main rotor assembly 18 about the main rotor axis A, a number of active vibration control (AVC) actuators 28 are coupled to one or more components of the aircraft 10. While shown in the context of a single rotor configuration, it is to be understood that aspects could be used on coaxial rotorcraft such as the X2® helicopter. Further, while shown attached to the airframe 12, the location of the actuators 28 is not limited thereto and not all actuators 28 need to be located in a common area.

Figure 2:
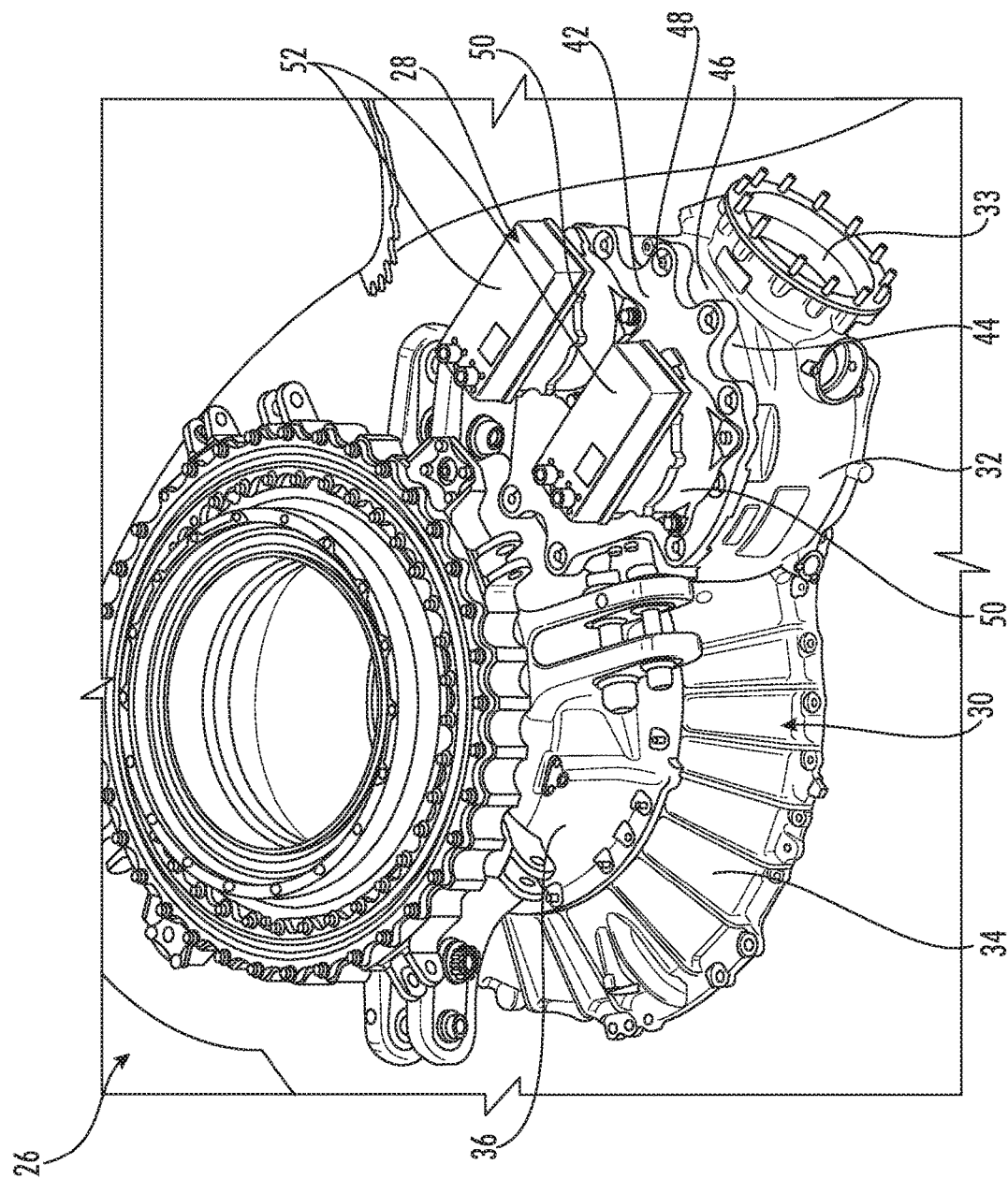
FIG. 2 is a perspective view of a transmission housing according to an embodiment.
Figure 3:
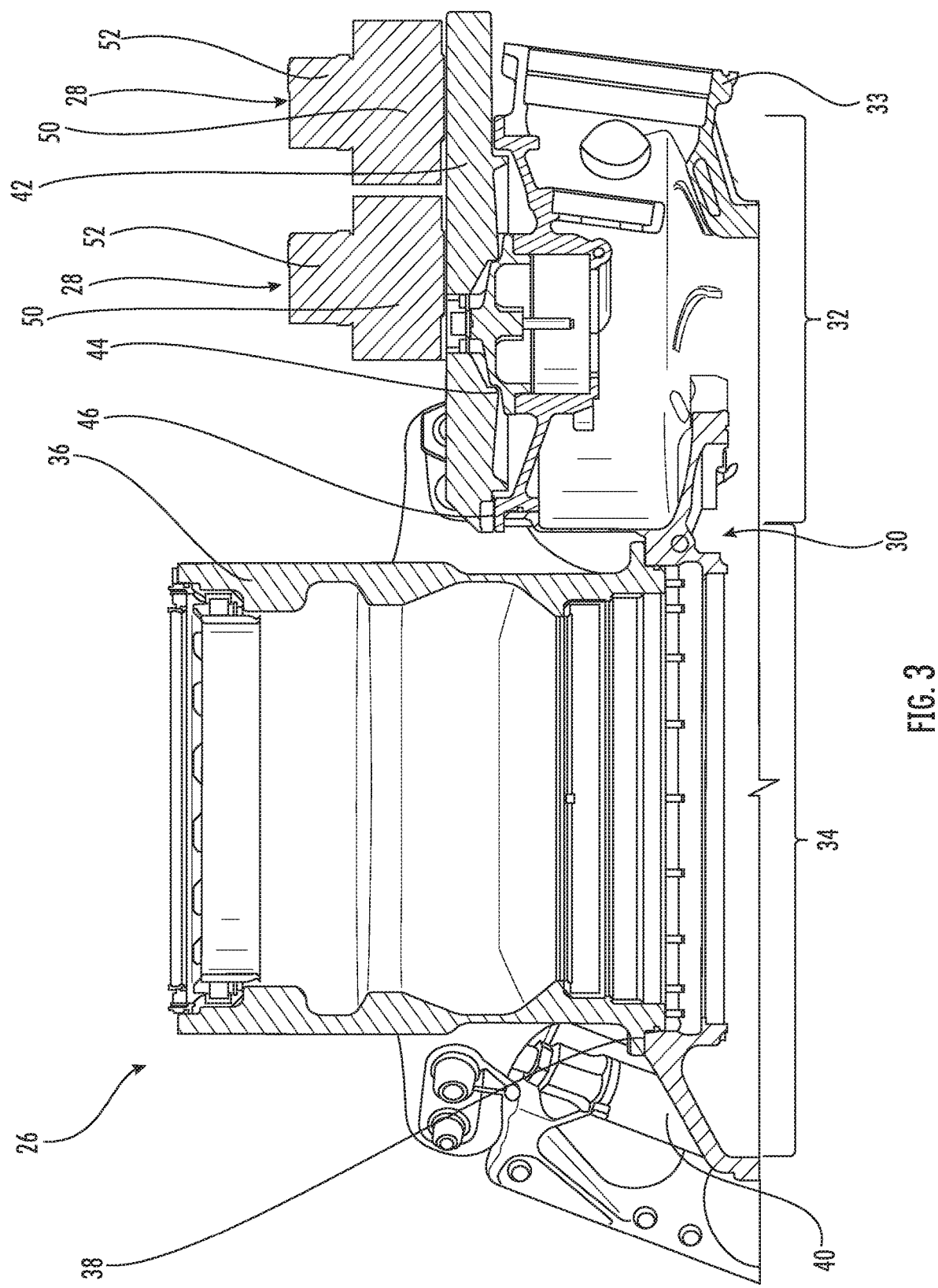
FIG. 3 is a cross-sectional view of a transmission housing including at least one force generator according to an embodiment.
Figure 4:
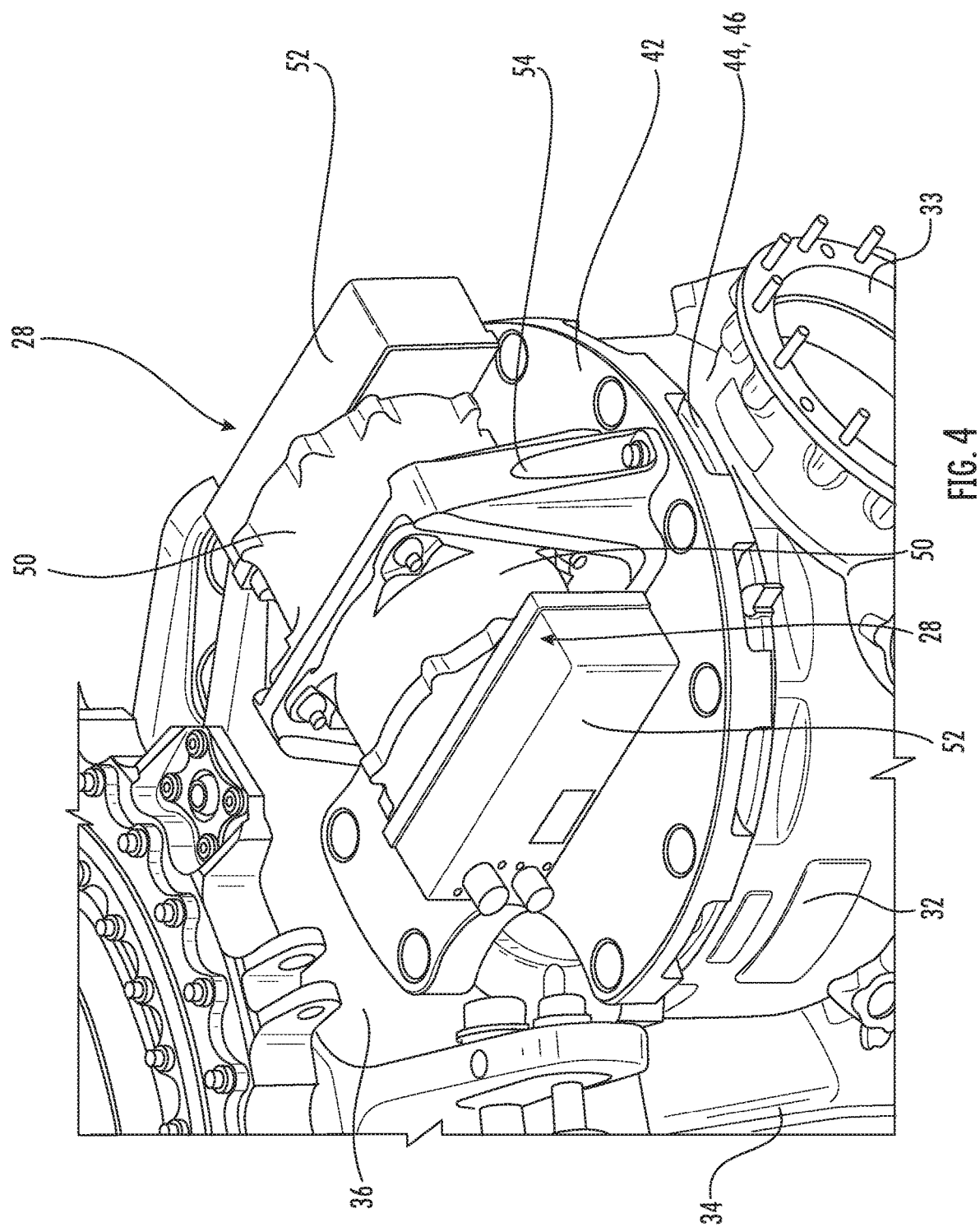
FIG. 4 is a perspective view of a transmission housing including at least one force generator according to an embodiment.

With reference now to FIGS. 2-4, a portion of the main gearbox 26 is illustrated in more detail. As shown, the main gearbox 26 includes a rotor transmission case 30 formed via any suitable manufacturing method including but not limited to machining. In the illustrated, non-limiting embodiment, the main gearbox 26 is a multi-stage gearbox such that the transmission case 30 includes a first portion 32 associated with a first stage of the gearbox 26 and a second, adjacent portion associated 34 with a second stage of the gearbox 26. In the illustrated, non-limiting embodiment, an end 33 of the first portion 32 of the gearbox 26 is adapted to connect to a corresponding power source, such as an engine 24 for example. A support element 36 associated with the main rotor assembly 18, such as a rotor standpipe for example, is mounted adjacent an upper surface 38 of the second portion 36 of the transmission case 30. The support element 36 is configured to receive a rotating shaft (not shown) of the main rotor system 18. At least one support strut 40 (see FIG. 3) extends from the support element 36 to secure the transmission case 30 to the airframe 12. Accordingly the support member 36 is rigidly mounted to the airframe 12 at each connection with a corresponding strut 40.

By eliminating unnecessary material from the gearbox 26, and in particular from the transmission case 30, the flexibility of the gearbox 26 is increased compared to conventional transmission cases. In an embodiment, the first portion 32 of the transmission case 30 may be able to flex or move relative to the second portion 34 of the transmission case 30, thereby defining a flexible region of the gearbox 26. This flexibility may provide for a small relative motion between the first portion 32 and second portion 34 of the transmission case 30. The overall increased flexibility of the gearbox 26 may allow vibrations to be more easily transmitted between the airframe 12 and the engine 24. It should be understood that the gearbox 26 illustrated and described herein is intended as an example only and that a gearbox 26 having any number of stages, such as a single stage or three stages for example, are also contemplated herein.

Several AVC actuators are sometimes placed such that the resulting anti-vibration loads are applied at the upper end of several struts 40 of the gearbox 26. This approach may be used to effectively nullify up to six vibratory loads and motions that would otherwise pass down the struts 40 and into the airframe 12 thus causing unwanted vibration. With a rigid transmission 26 this would effectively lessen or eliminate vibration in the airframe 12. However with a flexible gearbox 26, the transmission portion 32 vibrates in a manner not eliminated by the actuators placed adjacent to the struts 40 and transmits vibration to the engine 24 and thence to the airframe 12.

To reduce the transmission of vibrations to the engine 24 and thus to the airframe 12, one or more AVC actuators 28 are coupled to the gearbox 26. In the illustrated, non-limiting embodiments, two AVC actuators 28 are mounted to the first portion 32 of the transmission case 30 to counteract vibration therein. However, embodiments including any suitable number of AVC actuators 28, such as a single actuator or more than two actuators are also within the scope of the disclosure. As shown, an attachment plate 42 may be mounted to an upper surface 44 of the first portion 32. The attachment plate 42 may overlap with a flange 46 of the transmission case 30 such that a connection is formed there between using the existing studs or fasteners 48 of the transmission case 30 and provide a desired stiffness in consideration of the one or more AVC actuators 28 mounted directly thereto which his other than the stiffness of the first portion 32. A contour of the attachment plate 42 may have a shape complementary to first portion 32 of the transmission case 30, or may be different, for example to reduce the weight of the attachment plate 42. In an embodiment, such as shown in FIG. 3 for example, the attachment plate 42 may extend beyond the flange 46 of the transmission case 30, for example to provide additional surface area for supporting an AVC actuator 28 for example. Further, a cross-section of the attachment plate 42 may be substantially uniform over its thickness, or alternatively, may vary (see FIG. 4) to reduce the weight of the attachment plate 42.

Although the attachment plate 42 is illustrated and described as a component separate from and coupled to the gearbox 26, it should be understood that in other embodiments the attachment plate 42 may be integrally formed with the transmission case 30. In such embodiments, the attachment plate 42 may be a built up or thicker area of the transmission case 30 designed to provide a desired stiffness in consideration of the one or more AVC actuators 28 mounted directly thereto.

The one or more AVC actuators 28 may be mounted to the attachment plate 42 in a variety of configurations to substantially counteract the forces transmitted through the gearbox 26 between the airframe 12 and the engine 24. Although the actuators 28 are shown in a position about an exterior of the gearbox in each of the illustrated embodiments, embodiments where the actuators are mounted within an interior of the gearbox are also contemplated herein. As shown in FIG. 2, in an embodiment, a first and second substantially identical AVC actuator 28 are mounted laterally (i.e. side by side) across a width of the attachment plate 42. Alternatively, in another embodiment, see FIG. 3, a pair of AVC actuators 28 are mounted longitudinally across a depth of the attachment plate 42 (extending between the rotor standpipe 36 and the end 33 configured to connect to the engine 24). In each of these embodiments, the force generator 50 of each AVC actuator 28 is configured to generate a load in the plane of the upper surface of the attachment plate 42 which imparts a moment which is parallel to the aircraft Z-axis.

With reference now to FIG. 4, in another embodiment the AVC actuators 28 are rotated 180 degrees such that a controller 52 of the AVC actuators 28 is on its side relative to the attachment plate 42 such that the longitudinal axis of the force generator is arranged generally parallel to the upper surface 44 of the attachment plate 42 and to the Y-axis of the aircraft 10. In this configuration, the loads generated by the AVC actuators 28 impart moments which may be parallel to one or both of the X-axis and the Z-axis. As shown, an end of the force generator 50 of an AVC actuator 28 may contact a force transmission element 54. In this rotated configuration, the vertical and longitudinal loads generated by the force generator 50 are transmitted from the force generator 50 to the attachment plate 42 via the force transmission element 54. Although a single force transmission element 54 is shown in contact with each of the AVC actuators 28 of FIG. 4, embodiments where each AVC actuator 28 has a separate force transmission element 54 is also contemplated herein. Further, in embodiments including multiple AVC actuators 28, the plurality of AVC actuators 28 need not be arranged in the same configuration relative to the attachment plate 42.

Attaching one or more AVC actuators 28 directly to the transmission case 30, such as to the first portion 32 configured to connect to the engine 24, allows nulling vibrations configured to counteract vibration in the gearbox 26 to be transmitted from the actuators 28 to the gearbox 26 only, and not the airframe 12.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. An active vibration control system for an aircraft comprising:
    a gearbox operably coupling a power source and a component rotatable about an axis, the gearbox including a flexible region which allows flexure between a first stage and a second stage;
    at least one active vibration control actuator in vibrational communication with the flexible region to counteract vibrations transmitted between the power source and the rotatable component; and
    a transmission case including at least the first stage and the second stage;
    wherein the transmission case includes the flexible region and is connectable to the power source.

2. The active vibration control system of claim 1, wherein the gearbox further comprises
    a support element mounted to the transmission case and configured to support the component rotatable about the axis relative to the support element, the power source being coupled to the component via the gearbox to drive rotation of the component about the axis.

3. The active vibration control system of claim 2, wherein the power source is connectable to the first stage and the support element is connected to the second stage.

4. The active vibration control system of claim 2, wherein the at least one active vibration control actuator is coupled to the first stage of the transmission case.

5. The active vibration control system of claim 2, further comprising an attachment plate coupled to a surface of the transmission case, wherein the at least one active vibration control actuator is mounted to the flexible region of the transmission case via the attachment plate.

6. The active vibration control system of claim 5, wherein the at least one active vibration control actuator is operable to generate a load in a plane of an upper surface of the attachment plate.

7. The active vibration control system of claim 6, wherein the at least one active vibration control actuator is mounted laterally across a width of the attachment plate.

8. The active vibration control system of claim 6, wherein the at least one active vibration control actuator is mounted longitudinally across a depth of the attachment plate.

9. The active vibration control system of claim 5, wherein the at least one active vibration control actuator is operable to generate a vertical and longitudinal load in the attachment plate.

10. The active vibration control system of claim 9, wherein the at least one active vibration control actuator includes a controller coupled to a force generator, the at least one active vibration control actuator being oriented such that an axis of the force generator is parallel to the upper surface of the attachment plate.

11. The active vibration control system of claim 9, further comprising a force transmission element for transmitting forces generated by the at least one active vibration control actuator to counteract the vibrations transmitted between the power source and the rotating component to the attachment plate.

12. The active vibration control system of claim 5, wherein the at least one active vibration control actuator includes a first active vibration control actuator and a second active vibration control actuator.

13. The active vibration control system of claim 5, wherein the at least one active vibration control actuator is mounted to the attachment plate at an exterior of the gearbox.

14. The active vibration control system of claim 5, wherein the at least one active vibration control actuator is mounted to the attachment plate at an interior of the gearbox.

15. A rotary-wing aircraft comprising:
an airframe;
a drive system including a power source and a gearbox having a flexible region connected to the power source;
a rotor assembly operably coupled to the drive system;
at least one vibration control actuator in vibrational communication with the flexible region of the gearbox to counteract vibrations transmitted between the power source and the rotor assembly; and
a transmission case including at least a first stage and a second a second stage;
wherein the flexible region is formed between the first stage and the second stage.

16. The rotary wing aircraft of claim 15, wherein the first stage is coupled to the power source and the second stage includes a support element for receiving a rotating component of the rotor assembly.

17. The rotary wing aircraft of claim 16, wherein the at least one vibration control actuator is coupled to the first stage of the gearbox.

18. The rotary wing aircraft of claim 15, further comprising an attachment plate for indirectly connecting the at least one vibration control actuator to the gearbox.

* * * * *